United States Patent [19]

Markkula

[11] 4,327,786

[45] May 4, 1982

[54] WORK FIXTURE

[76] Inventor: Orvo E. Markkula, Canton, N.Y. 13617

[21] Appl. No.: 167,678

[22] Filed: Jul. 11, 1980

[51] Int. Cl.$^3$ .............................................. B27C 5/02
[52] U.S. Cl. .................................... 144/154; 33/435; 33/27 G; 144/139; 144/145 R; 269/56; 269/58; 269/303; 409/221; 409/225
[58] Field of Search ............... 409/219, 221, 225, 226; 144/136 R, 136 C, 134 R, 134 D, 323, 145 R, 154, 137, 139; 33/435, 174 TA, 174 TD, 27 G; 269/55, 56, 58, 71, 73, 303, 304

[56] References Cited

U.S. PATENT DOCUMENTS

| | | | |
|---|---|---|---|
| 824,966 | 7/1906 | Werner | 33/27 G |
| 1,826,375 | 10/1931 | Van Buskirk | 33/435 |
| 3,248,101 | 4/1966 | Muller et al. | 269/58 |
| 3,998,127 | 12/1976 | Romeu | 409/225 |

Primary Examiner—W. D. Bray
Attorney, Agent, or Firm—Bruns & Jenney

[57] ABSTRACT

A fixture for providing positive control over a workpiece as it is being acted upon by a cutting or finishing tool. A base having a flat working surface is provided with a fixed guide member having a contoured control surface formed along the periphery thereof. A workholder is slidably supported upon the working surface of the base and is arranged to move in abutting contact against the control surface of the guide whereby a prescribed motion is imparted to a workpiece supported in the holder. In one form of the invention, the workholder is mounted upon a turntable that is rotatably supported in a circular guide whereby the work is caused to rotate about a fixed axis.

6 Claims, 4 Drawing Figures

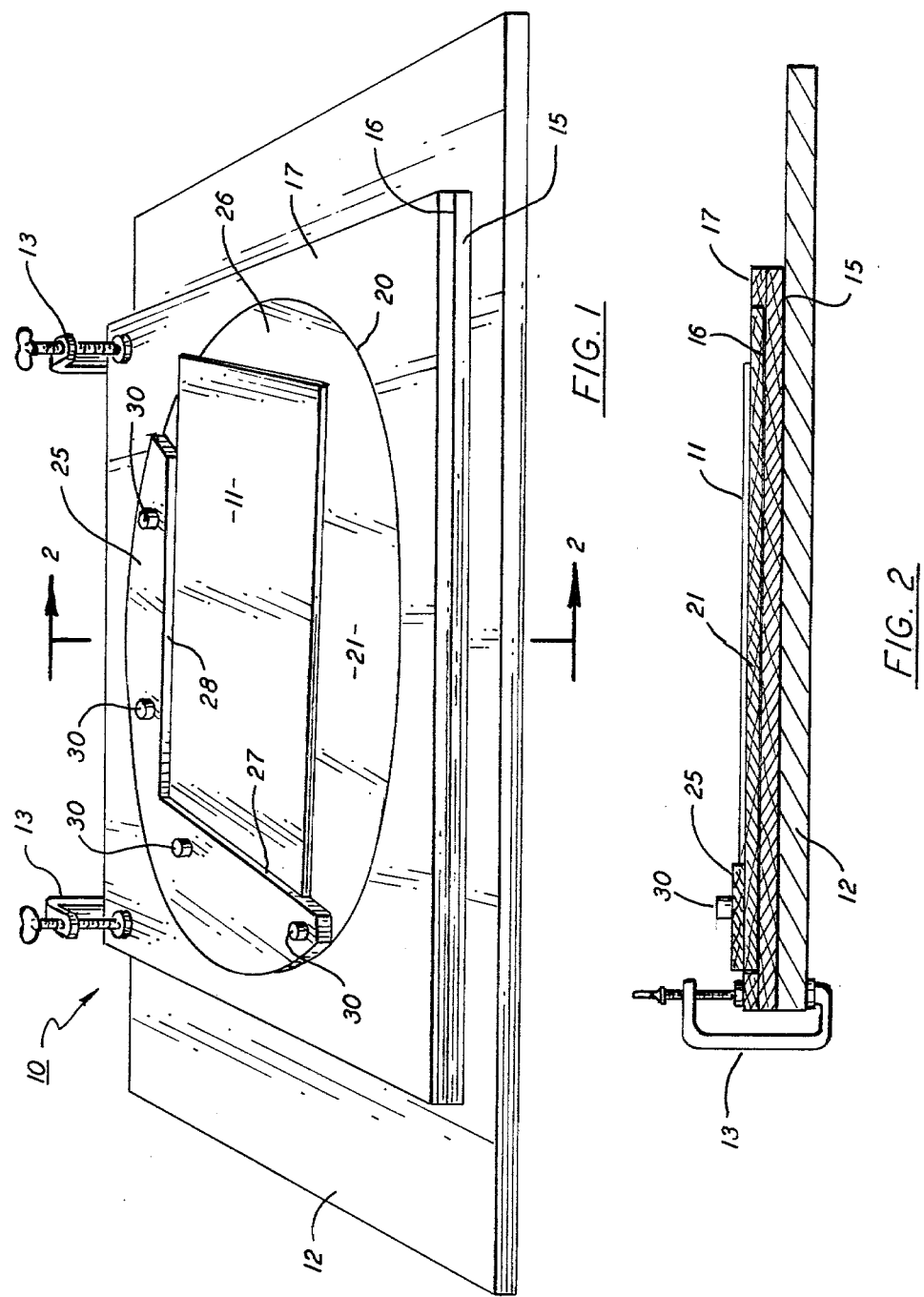

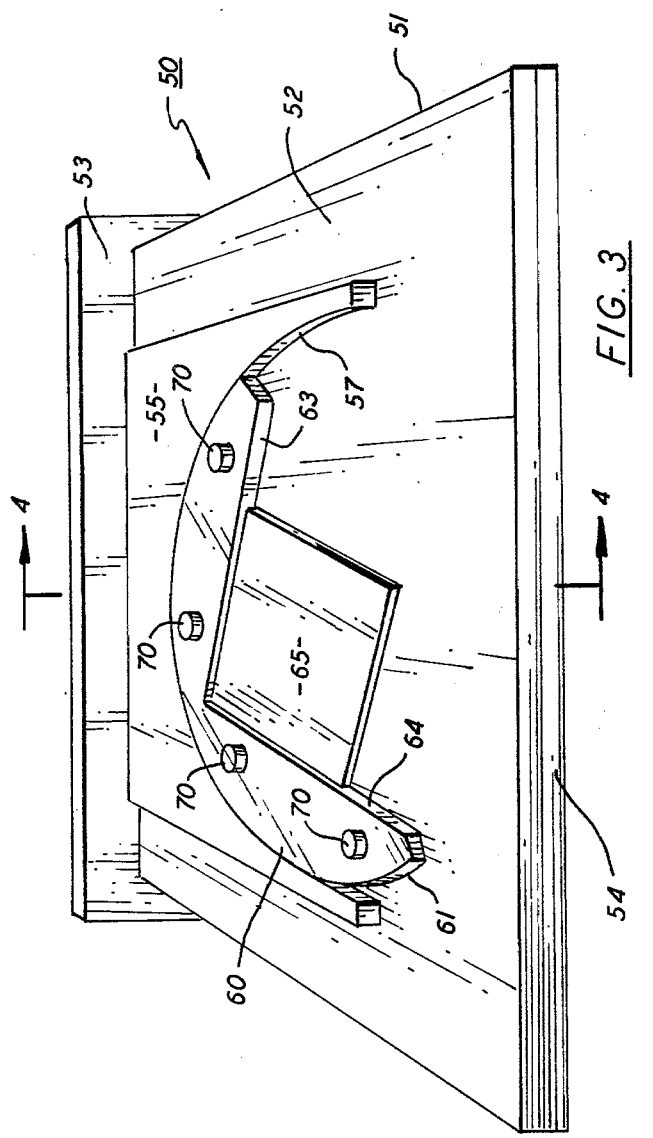
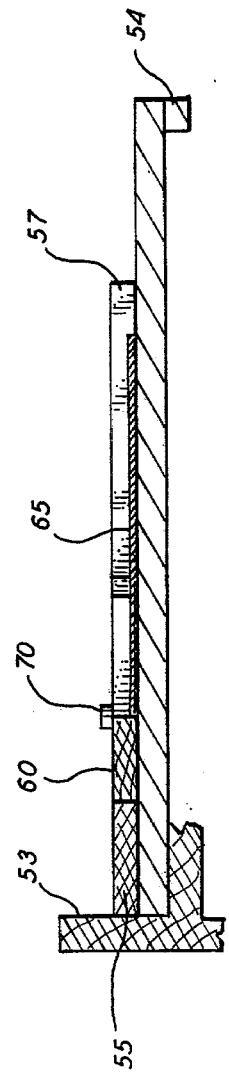

WORK FIXTURE

BACKGROUND OF THE INVENTION

This invention relates to a means for positively controlling the positioning and/or movement of a workpiece as the piece is being worked by a hand-craftsman.

More specifically, this invention relates to a device suitable for use by a hand-craftsman or the like which will enable the craftsman to either quickly and accurately position or reposition a workpiece that is situated upon a working surface or, alternatively, to move a workpiece with a prescribed motion over the working surface as it is being acted upon by a cutting or finishing tool to generate a desired contour or outline upon the work.

Most hand-craftsmen who are interested in forming cuts or finishes in a workpiece, carry out their work at a bench or table having a flat working surface. The work is typically held in one hand and a tool or instrument for carrying out the desired operation is held in the other hand. When a relatively straight pull or push cut is to be made, the work is sometimes placed against a rest or stop to prevent it from moving as the cut is being taken. However, for the most part, control over the tool and/or work has heretofore been dependent mostly upon the skill and experience of the artisan.

In U.S. Pat. No. 4,056,136, there is disclosed a guide apparatus for use in conjunction with a portable tool of the type generally used to carve or sculpt a work element. The apparatus includes a face plate having an independent four jaw chuck mounted thereon for positively securing the work to the plate. A maulstick is passed laterally over the surface of the plate to provide a rest upon which the tool-holding hand of the craftsman is placed. The other hand of the workman is used to manipulate the handle of the maulstick which, in turn, guides the tool over the surface of the work. The face plate and chuck form a relatively heavy and complex combination that is sometimes difficult in practice to utilize. The clamping jaws are further capable of marring or deforming the workpiece which would prohibit the use of this equipment on workpieces made of precious or delicate materials. It should also be noted that the user's hands are both occupied in guiding the maulstick and the tool and, as a consequence, the face plate cannot be manually turned by the artisan as the piece is being worked. This is particularly undesirable where complex or intricate designs are being worked.

SUMMARY OF THE INVENTION

It is therefore an object of the present invention to improve handcrafting apparatus for positioning and moving a workpiece as it is being acted upon by a tool or the like.

It is a further object of the present invention to provide a fixture that will enable a hand-craftsman to manually impart a precise motion to a workpiece as the piece is being acted upon by a hand-held tool.

Another object of the present invention is to provide a holding fixture that will safely support a relatively delicate workpiece against the action of a tool without marring or deforming the work.

A still further object of the present invention is to provide a holding fixture for a handcrafter that will accept workpieces of various sizes and shapes without having to adjust or otherwise modify the fixture.

Yet another object of the present invention is to increase both the accuracy and the versatility by which an artisan can hand work materials.

Still another object of the present invention is to provide a simple and inexpensive device for holding and maneuvering a workpiece as the piece is being acted upon by a hand-craftsman.

These and other objects of the present invention are attained by means of apparatus that includes a base having a planar working surface upon which is fixedly mounted a guide member having a contoured control surface, a workholder slideably supported upon the working surface of the base containing a follower surface that is adapted to move in abutting contact over the control surface to impart a prescribed motion to a workpiece supported thereon. In one embodiment of the invention the guide element contains a cylindrical opening having a turntable rotatably supported therein upon which is mounted a workholder for receiving a workpiece therein.

BRIEF DESCRIPTION OF THE DRAWINGS

For a better understanding of these and other objects of the present invention reference is had to the following detailed description of the invention which is to be read in conjunction with the following drawings, wherein;

FIG. 1 is a perspective view of a work-supporting fixture that embodies the teachings of the present invention showing a workpiece mounted therein;

FIG. 2 is a section taken along lines 2—2 in FIG. 1;

FIG. 3 is another perspective view showing a second embodiment of the invention; and FIG. 4 is a section taken along lines 4—4 in FIG. 3.

DESCRIPTION OF THE INVENTION

Referring initially to FIGS. 1 and 2, there is illustrated a fixture, generally referenced 10, that is ideally well suited for positively controlling the positioning and/or movement of a workpiece 11 as the work is being processed by a hand-craftsman. The present device is designed to facilitate control of the workpiece while the artisan is making straight or arcuate cuts as utilized in engraving, scribing or finishing the surface of a workpiece as in a scraping, burnishing or polishing operation. It is further envisioned that the device will also be used in linoleum block and wood carving as well as many other forms of stencil cutting, drawing and leather working where it is desirable to rotate the work with a relatively high degree of accuracy and control.

The fixture 10 is adapted to be seated upon the top of a work bench or table 12 and secured thereto by means of a pair of C-clamps 13—13 or any other similar holding device capable of holding the fixture fixedly to the bench. The present fixture includes a rectangular base 15 that has a planar upper surface 16 that constitutes what will herein be referred to as the working surface of the fixture. Positioned immediately over the base is a guide member 17 that is configured to compliment the base. The guide is affixed to the base as by gluing. However, any other means of joinder as known and used in the art may be similarly employed. The guide member contains a circular opening 20 that is adapted to pass downwardly in a vertical direction through the guide. In assembly, the axis of the circular opening, and thus the side wall thereof, is perpendicular to the working surface of the base.

A circular turntable 21 is received within the guide opening 20. The outer periphery of the turntable forms a close running fit with the inner wall of the opening so that when the turntable is rotated within the opening it turns about a fixed axis with no discernible lateral movement. The thickness of the turntable is substantially equal to that of the guide member to position the top surface of the turntable and the top surface of the guide in a common plane. The two surfaces thus act in concert to form a relatively large platform for supporting a workpiece.

A workholder 25 is secured by any suitable means to the top surface 26 of the turntable for movement therewith. The workholder is generally semicircular in form and contains a cutout that is created by two othogonal locating surfaces 27 and 28. The locating surfaces are cut inwardly from the outer periphery of the holder and meet to form a right angle corner. The locating surfaces extend upwardly from the top surface of the turntable a sufficient distance to enable a workpiece mounted upon the turntable to be registered thereagainst.

As best seen in FIG. 1, a rectangular-shaped workpiece 11 is mounted in the workholder in registration against the floating surfaces. The work, in practice, is seated upon the top surface of the turntable with a pair of adjacent side edges abutting the two locating surfaces 27 and 28 to accurately and securely mount the work within the fixture. Because the top surface of the turntable lies in the same plane as that of the guide, the size of the workpiece is not restricted by the size of the turntable. As shown, the workpiece can extend beyond the boundaries of the turntable without adversely affecting the functional characteristics of the fixture.

A plurality of strategically positioned pins 30—30 are mounted upon the workholder 25 with the pins extending upwardly in a vertical direction from the top surface thereof. The pins are of a size and shape that make them easily engageable by the hand of the user so that he can accurately maneuver the turntable upon the base. In operation, the turntable has the freedom to turn through 360° of rotation. Accordingly, a workpiece situated thereon can be accurately rotated by the craftsman while at the same time allowing him to operate upon the work with a hand-held tool to create any number of intricate cuts and/or finishes.

To provide for a smoother operating turntable, the top surface of the base may be furnished with a coating of low friction material upon which the cylindrical table can slide with a minimum amount of effort. It should be clear to one skilled in the art that the guide and base can be formed from a single piece of material by simply cutting a blind hole into the top surface of the base. Similarly, the component parts of the fixture may be fabricated from any suitable material with wood being preferred. Tempered pressboard has been found to be well suited when working thin metal sheets or linoleum, and plywood when the fixture is used for linoleum block cutting and and wood carving.

Referring now to FIGS. 3 and 4, there is shown a second embodiment of the present invention illustrating a fixture generally referenced 50 that contains a flat rectangular base 51 having a planar working surface 52 thereon. The back edge of the base is shown abutting a section of a vertical wall 53 which serves to stabilize the fixture when it is in use. A downwardly turned lip 54 is secured to the front edge of the base. Although not shown, the lip can be placed over the edge of a table or workbench upon which the fixture is seated to provide a stop for again preventing the fixture from sliding on the supporting surface as a piece is being worked therein.

An open-sided guide 55 is secured to the working surface of the base with one edge of the guide abutting the raised rib 53. A circular control surface 57 is cut or otherwise formed in the guide with the open side of the guide facing the front of the fixture. A workholder 60 is slideably supported upon the working surface of the base and includes a perimetral follower surface 61 that is circular in form and which compliments the contour of the circular control surface formed in the guide. In assembly, the follower surface of the workholder rides in abutting contact against the control surface of the guide to impart a circular motion to a workpiece mounted in the holder.

The workholder is furnished with a pair of orthogonal locating surfaces 63 and 64 that are perpendicularly aligned with respect to the working surface of the base. A workpiece, as for example the rectangular workpiece 65 shown in FIGS. 3 and 4, is supported within the holder by placing the work in abutting contact against the two locating surfaces. Rotating the holder against the guide thus imparts a circular motion to the work. It should be understood, however, that the contour of both the control surface and the follower surface may be varied to impart different types of motion to the work without departing from the teachings of the present invention.

To facilitate movement of the holder within the guide, there is furnished a series of pins 70—70 that extend upwardly from the top surface of the workholder and which can be easily grasped by the hand of a craftsman using the fixture. Here again, the fixture can be employed to rapidly move the work to any number of positions or, alternatively, to allow the craftsman to manually turn the work while it is being operated upon by a hand-held cutting or finishing tool.

While this invention has been described with reference to the details as set forth above, it is not limited to the specific structure as disclosed and the invention is intended to cover any modifications or changes as may come within the scope of the following claims.

I claim:

1. Apparatus for controlling the positioning and movement of a workpiece as it is being worked upon by a tool or the like including a base having a planar working surface, a guide member situated upon the working surface of the base, said guide member having an extended flat top surface for slidably supporting a workpiece thereupon and a cylindrical opening passing centrally therethrough so that the axis of said opening is perpendicular with the plane of the working surface, a cylindrical turntable positioned within said opening, the outer periphery of the turntable having a close running fit with the side wall of said opening whereby the turntable is rotatable within the guide member about a fixed axis and the top surface of said turntable being coplanar with the extended surface of the guide member, a workholder secured to the top surface of the turntable that projects upwardly above said top surface of the turntable, said workholder having at least one raised indexing surface formed therein for receiving a workpiece in abutting contact thereagainst whereby the workpiece abutting the surface and the workholder will rotate with said turntable about said fixed axis, and hand-engageable means associated with the turntable to facilitate rotation of the turntable within the guide so that a workpiece mounted in the workholder can be turned as it is being worked upon.

2. The apparatus of claim 1 wherein said hand-engageable means includes a series of raised pins extending upwardly from the top surface of the workholder.

3. The apparatus of claim 1 wherein the workholder includes a pair of orthogonal locating surfaces that are perpendicular to the working surface and which pass inwardly from the outer periphery of the workholder whereby a workpiece located in said workholder may pass outwardly beyond the side margin of the turntable.

4. The apparatus of claim 1 that further includes a means for securing the base to a work table.

5. The apparatus of claim 1 wherein said base and said guide are formed of a single piece of material.

6. The apparatus of claim 1 wherein the working surface of the base contains a low friction coating to allow the turntable to move freely thereon.

* * * * *